Nov. 6, 1923.
T. J. JACKSON
TIRE PATCH
Filed March 21, 1923
1,473,184
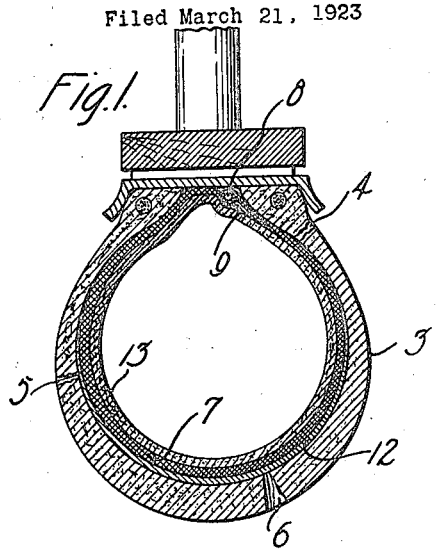
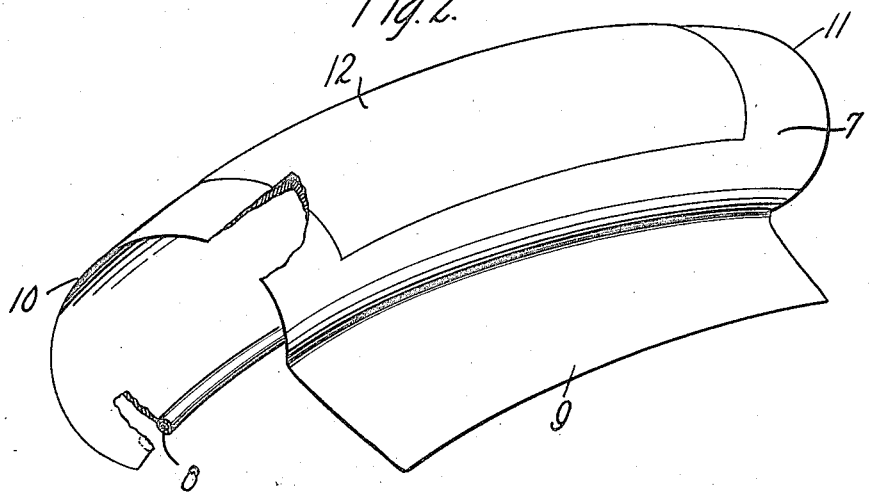
Inventor:
Truverton J. Jackson,
by Bennett H. Jackson Atty.

Patented Nov. 6, 1923.

1,473,184

UNITED STATES PATENT OFFICE.

TRUVERTON J. JACKSON, OF COLUMBUS, OHIO.

TIRE PATCH.

Application filed March 21, 1923. Serial No. 626,639.

*To all whom it may concern:*

Be it known that I, TRUVERTON J. JACKSON, a citizen of the United States, residing at Columbus, in the county of Franklin, State of Ohio, have invented certain new and useful Improvements in Tire Patches, of which the following is a full, clear, concise, and exact description.

This invention relates to tire patches and more particularly relates to a reinforcement device for repairing pneumatic tires and has for an object the provision of a reinforcing means capable of repairing a break or defect in the tire casing regardless of its location.

The preferred form of this invention comprises a patch of a plurality of layers of regular rubberized tire fabric vulcanized, for example over an oval mould, so that the fabric will be of the proper form to fit the interior of a pneumatic tire casing. The fabric should be of sufficient length to extend entirely around the interior of the casing and also overlap to a substantial extent. One of the overlapping edges is provided with suitable stiffening means, such as a heavy copper wire, extending substantially the entire width of the patch. The overlapping edge which is not provided with this bead or stiffening means is preferably a tapered edge, that is, much thinner than the body of the patch whereby the beaded end will tend to bury itself in the overlapping flap so as to provide an interlocking arrangement. This will greatly assist in keeping the patch in place after the inner tube has been inflated. The width of the patch may be varied considerably to meet different requirements and it may be as long as one foot or longer. Each side edge of the patch is preferably given a feathered edge so as to prevent any pinching of the inner tube due to an abrupt change in the interior wall of the casing. The outer covering of the patch is of semi-cured rubber, which is coated with cement, ready for instant use, and therefore readily vulcanizes itself to the casing when applied.

This invention will be better understood by reference to the following detailed description taken in connection with the accompanying drawings in which Fig. 1 is a cross sectional view showing the patch of this invention applied to the interior of a damaged casing; and Fig. 2 is a view in perspective with parts torn away of one form of this invention.

Referring in detail to the drawings, Fig. 1 shows a damaged automobile tire casing, 3, which may be rim cut as at the point 4, or may be punctured as at the point 6, or may have a broken side wall as at the point 5.

Mounted within the interior of the casing at the point where the casing is damaged in one or more of the above ways is a tire patch 7 of this invention. This patch comprises several layers of regular rubberized tire fabric which has been vulcanized over an oval mould so that it will fit properly the interior of the casing. One edge of the patch contains a bead 8 which is embedded in the rubberized fabric for substantially the entire length of the patch and which lies close to the edge and substantially parallel thereto. This bead may consist of a steel or copper wire or it may be a length of cord or hard rubber.

The patch is preferably made of a greater length than the circumference of the casing so as to allow the two edges to overlap considerably. The part of the patch which overlaps is preferably made as a thin rubber flap 9 tapering to a feather edge.

When the inner tube 13 is placed in the casing and inflated the bead will tend to bury itself in the flap 9 thereby causing an interlocking of the patch. The bead being made of hard material, non-resistant, also prevents the patch from sagging over a blowout hole in the casing, so as to cause the patch to function much more satisfactorily than a patch which has no bead.

The two sides 10 and 11 of the patch are composed simply of a rubber strip which ends in a tapered edge so as to prevent the inner tube from being pinched by an abrupt change from the patch to the interior of the casing.

The outer portion 12 of the patch is made of semi-cured rubber coated with cement so that the patch is ready for instant use. After the patch is applied and the tire inflated, the patch vulcanizes itself to the casing thereby insuring a permanent patch with a minimum of time required by the user.

Due to the fact that the patch is made of substantially the same thickness for its entire length around the interior of the casing, the patch will take care of a break in the casing regardless of where the break may be.

The length of the bead 8 is preferably less than the length of the patch so as to allow the patch at the ends of the bead to be gradually tapered to a feather edge.

Care should be taken to insure that the wire or other material forming the bead 8 is well covered by the rubberized material to prevent the wire from injuring the casing or inner tube.

It will be apparent from an inspection of Fig. 2 what the general conformation of the patch is like.

It is to be understood that this invention may possess many forms without departing from the spirit of this invention as defined in the appended claims.

The invention claimed is:

1. Reinforcing means for the interior of a tire casing comprising a patch of thick rubberized material of a length sufficient to extend entirely around the inner tube and to overlap to a substantial degree, one of said overlapping ends being provided with a length of flexible metallic stiffening means entirely imbedded in the rubberized material and being located adjacent and substantially parallel to that end of the material, the end of said material overlapping the end containing said stiffening means being considerably thinner than the main body portion of said material, the remaining edges of the material being tapered to a thin edge.

2. Reinforcing means for the interior of a tire casing comprising a patch of thick rubberized material of a length sufficient to extend entirely around the inner tube and to overlap to a substantial degree, one of said overlapping ends being provided with a length of flexible stiffening means imbedded in the rubberized material and being located adjacent and substantially parallel to that end of the material, the end of said material overlapping the end containing said stiffening means being considerably thinner than the main body portion of said material, the remaining edges of the material being tapered to a thin edge, the side of said patch next to the casing comprising a substantial layer of semi-cured rubber.

In witness whereof I hereunto subscribe my name this 12th day of February, A. D., 1923.

TRUVERTON J. JACKSON.